J. DOEPKER & F. W. BURGER.
POWER TRANSMISSION MECHANISM.
APPLICATION FILED MAY 31, 1912.
1,057,530. Patented Apr. 1, 1913.
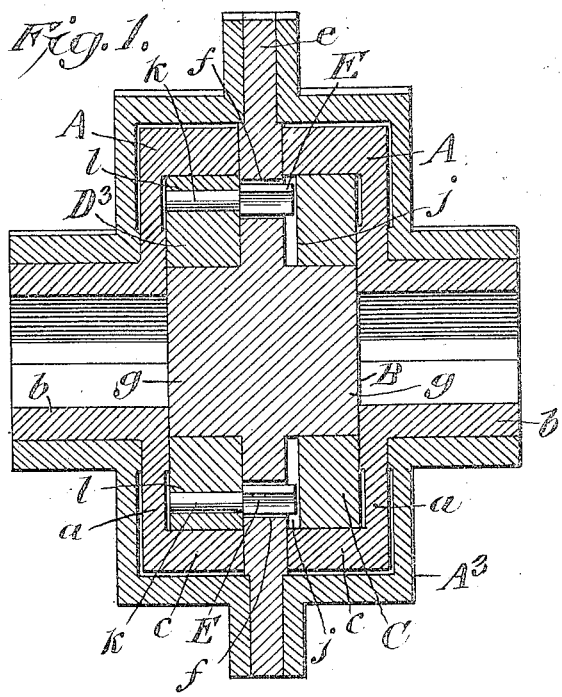
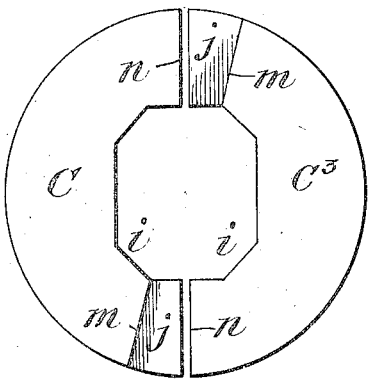
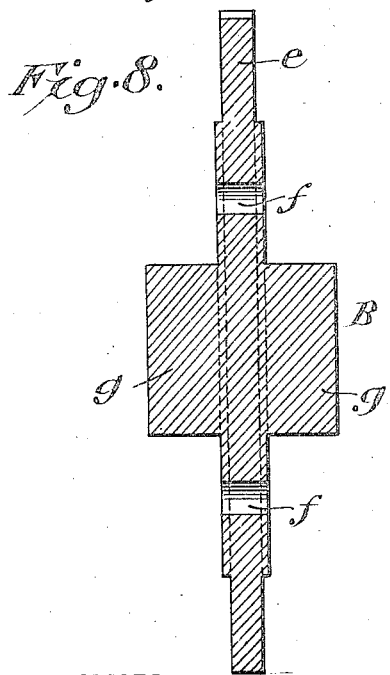
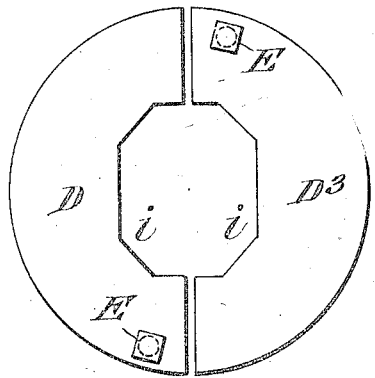

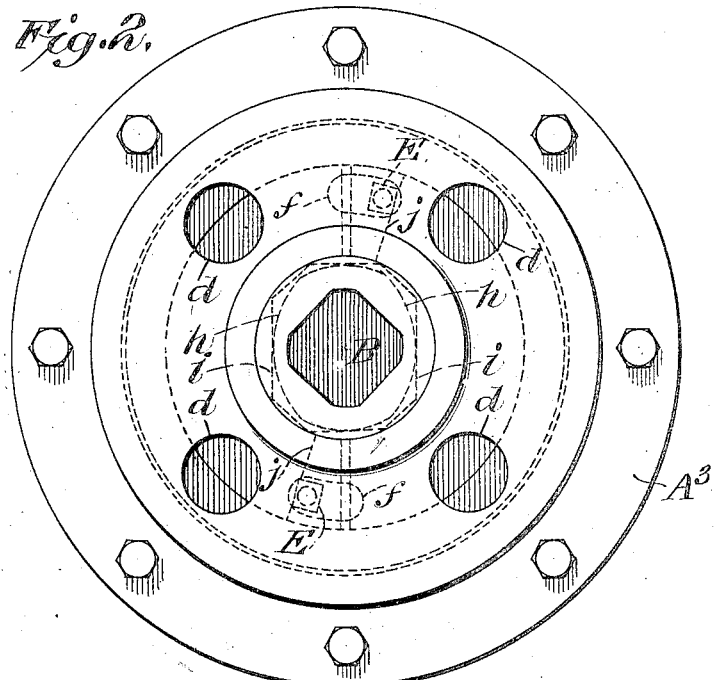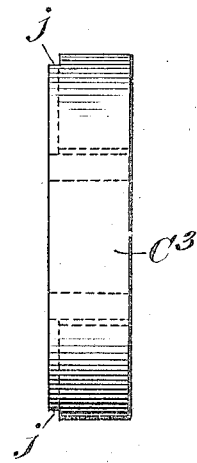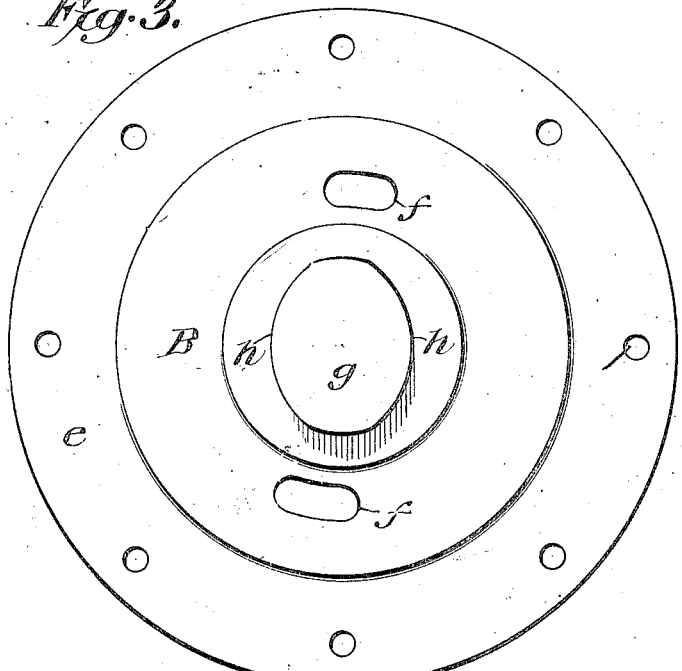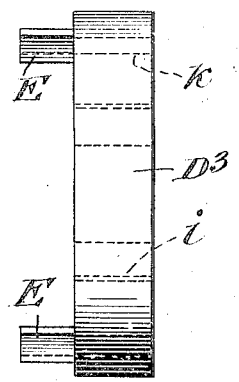

UNITED STATES PATENT OFFICE.

JOSEPH DOEPKER AND FREDERICK W. BURGER, OF FORT WAYNE, INDIANA.

POWER-TRANSMISSION MECHANISM.

1,057,530.  Specification of Letters Patent.  Patented Apr. 1, 1913.

Application filed May 31, 1912. Serial No. 700,878.

*To all whom it may concern:*

Be it known that we, JOSEPH DOEPKER and FREDERICK W. BURGER, citizens of the United States, residing at Fort Wayne, in the county of Allen and State of Indiana, have invented new and useful Improvements in Power-Transmission Mechanism, of which the following is a specification.

Our present invention pertains to power-transmission mechanism; and it has for its general object to provide a power-transmission mechanism differential in character and designed more particularly for use in motor vehicles, the said mechanism being calculated to transmit power to the wheel having the greater traction, and to assure maximum effort under any condition of road.

Our novel power-transmission mechanism is also adapted to prevent skidding of a car incidental to the application of power, and is of such character that the tractive effort is exerted by the slower moving wheel, as distinguished from the well known differential gear in which the tractive effort is exerted by the faster moving wheel.

With the foregoing in mind our invention will be fully understood from the following description and claims when the same are read in connection with the drawings accompanying and forming part of this specification, in which:

Figure 1 is a diametrical section of the power-transmission mechanism constituting the best practical embodiment of our invention that we have as yet devised. Fig. 2 is a side elevation of the same. Fig. 3 is a side elevation of the cam member comprised in the mechanism. Figs. 4 and 5 are views illustrative of one pair of clutch members included in the mechanism, and: Figs. 6 and 7 are detail views of the other pair of clutch members comprised in the mechanism; the members shown in Figs. 6 and 7 being disposed at the opposite side of the cam member, with reference to the members shown in Figs. 4 and 5. Fig. 8 is a diametrical section of the cam member.

Similar letters of reference designate corresponding parts in all of the views of the drawings.

Our novel mechanism comprises two drums A which, when our invention is incorporated in a motor vehicle, are designed to be connected either directly or indirectly with the driving wheels. We would have it understood, however, in this connection that the drums A may be connected with driving members other than wheels, according to the application made of our invention. Each of the said drums A comprises a body portion $a$, a sleeve $b$ integral with and extending outward from said body portion, and a circular flange $c$ directed inward from the body portion. The two drums are inclosed, by preference, in a casing $A^2$, which casing serves to hold the drums in position, and is provided with suitably shaped openings $d$ for the entrance of a suitable lubricant.

Interposed between the opposed flanges $c$ of the drums A is the cam member of the mechanism, and in the practical use of the mechanism power is applied or transmitted to the said cam member through the medium of any suitable means (not shown). The said cam member is lettered B, and is of the form clearly shown in Figs. 1 and 3—*i. e.*, it comprises a plate $e$ having one or more, preferably two, slots $f$ that describe parts of a circle, and lateral projections $g$ at the opposite sides of the plate and in the center thereof; said projections $g$ constituting symmetrically shaped cams provided with ground surfaces $h$, eccentric to the center of the member.

Disposed at one side of the cam member B are clutch members C $C^3$, and disposed at the opposite side of the cam member B are clutch members D $D^3$. All of the said clutch members are provided in their inner or opposed edges with openings $i$, the walls of which are preferably shaped as shown, so as to enable the cam surfaces $h$ by acting against said walls to cause the clutch members of each pair to spread. It will also be manifest by reference to the drawings that the clutch member C is provided in its side adjacent the cam member B with a recess $j$, and that the clutch member $C^3$ is provided with a similar recess $j$; the said recesses being located so as to rest diametrically opposite each other when the members C $C^3$ are relatively arranged in proper manner. Each of the clutch members D $D^3$ is provided with a lateral projection E, the said projection being preferably square in cross-section and carried by a journal $k$, disposed in a transverse aperture $l$ of the member. The said lateral projections E extend loosely through the elongated apertures $f$ of the cam member B, and have their ends disposed in the recesses $j$ of the clutch members C $C^3$, as clearly appears in Fig. 1.

In the practical use of our novel mechanism power is transmitted through any approved means to the cam member B, and the latter through its cams $g$ spreads the clutch members C C³, D D³ and presses the same against the inner surfaces of the drum flanges $c$, and thereby causes the drums to revolve. When, during the use of the transmission mechanism the pairs of clutch members are locked in the driving position, the lateral projections E of the clutch members D D² occupy positions about midway between the side walls $m$ and $n$ of the recesses $j$ in the clutch members C C³. In the event of one of the wheels turning faster than the other, as when a motor vehicle is making a turn, the clutch members complementary to the fast turning wheel are unlocked and carried forward because of the friction between the said members and the drum complementary thereto. When the clutch members are in a neutral position—*i. e.*, a position midway between the position for driving ahead and the position for moving rearward, the projections E engage sides of the recesses $j$, with the result that the clutch members complementary to the faster moving wheel are held from locking, and consequently the wheel is permitted to travel faster indefinitely. This operation is true of either wheel and the clutch members complementary thereto irrespective of whether the motor vehicle is moving forward or backward.

While our novel transmission mechanism is designed more particularly for embodiment in motor vehicles, we desire it distinctly understood that the said mechanism may be put to any use to which it is applicable, without involving departure from the scope of our invention.

We have entered into a detailed description of the construction and relative arrangement of the elements embraced in the present embodiment of our invention in order to impart a full, clear, and exact understanding of the said embodiment. We do not desire, however, to be understood as confining ourselves to the said specific construction and relative arrangement of parts as in the future practice of the invention such changes or modifications may be made as fairly fall within the scope of our appended claims.

Having described our invention, what we claim and desire to secure by Letters-Patent, is:

1. In a power-transmission mechanism, the combination of suitably supported drums, a cam member interposed between the drums and having lateral projections constituting cams and also having elongated curvilinear apertures, clutch members arranged within one drum and at one side of the major portion of the cam member and having openings in their opposed edges to receive one of the lateral projections of the cam member and also having recesses in their sides adjacent the major portion of the cam member, and clutch members arranged at the opposite side of the major portion of the cam member and having openings in their opposed edges to receive the other lateral projection of the cam member and also having lateral projections extending through the said apertures of the cam member and into the recesses of the first-named clutch members; the said projections having journals disposed in the clutch members by which they are carried.

2. In a power-transmission mechanism, the combination of suitably supported drums, a cam member interposed between said drums and having lateral projections constituting cams, and also having an elongated curvilinear aperture, clutch members disposed within one drum and having openings in their opposed edges to receive one of the lateral projections of the cam member, one of the said clutch members having a recess in its side adjacent the major portion of the cam member, and clutch members arranged at the opposite side of the major portion of the cam member and having openings in their opposed edges to receive the other lateral projection of the cam member, one of the second-named clutch members also having a lateral projection extending through the aperture in the cam member and into the said recess in one of the first-named clutch members.

3. In a power-transmission mechanism, the combination of suitably supported drums, cams arranged in said drums, clutch members disposed within one drum and having openings in their opposed edges to receive one of the cams; one of the said clutch members having a recess in its inner side, clutch members arranged in the other drum and having openings in their opposed edges to receive the other cam, and a lateral projection connected with one of the second-named clutch members and extending into the said recess in one of the first-named clutch members.

In testimony whereof we have hereunto set our hands in presence of two subscribing witnesses.

JOSEPH DOEPKER.
FREDERICK W. BURGER.

Witnesses:
  Van B. Perrine,
  Howard F. Hull.